April 28, 1925.

W. O. SIEVERS

ELEVATOR FOR SILOS

Filed Nov. 4, 1922

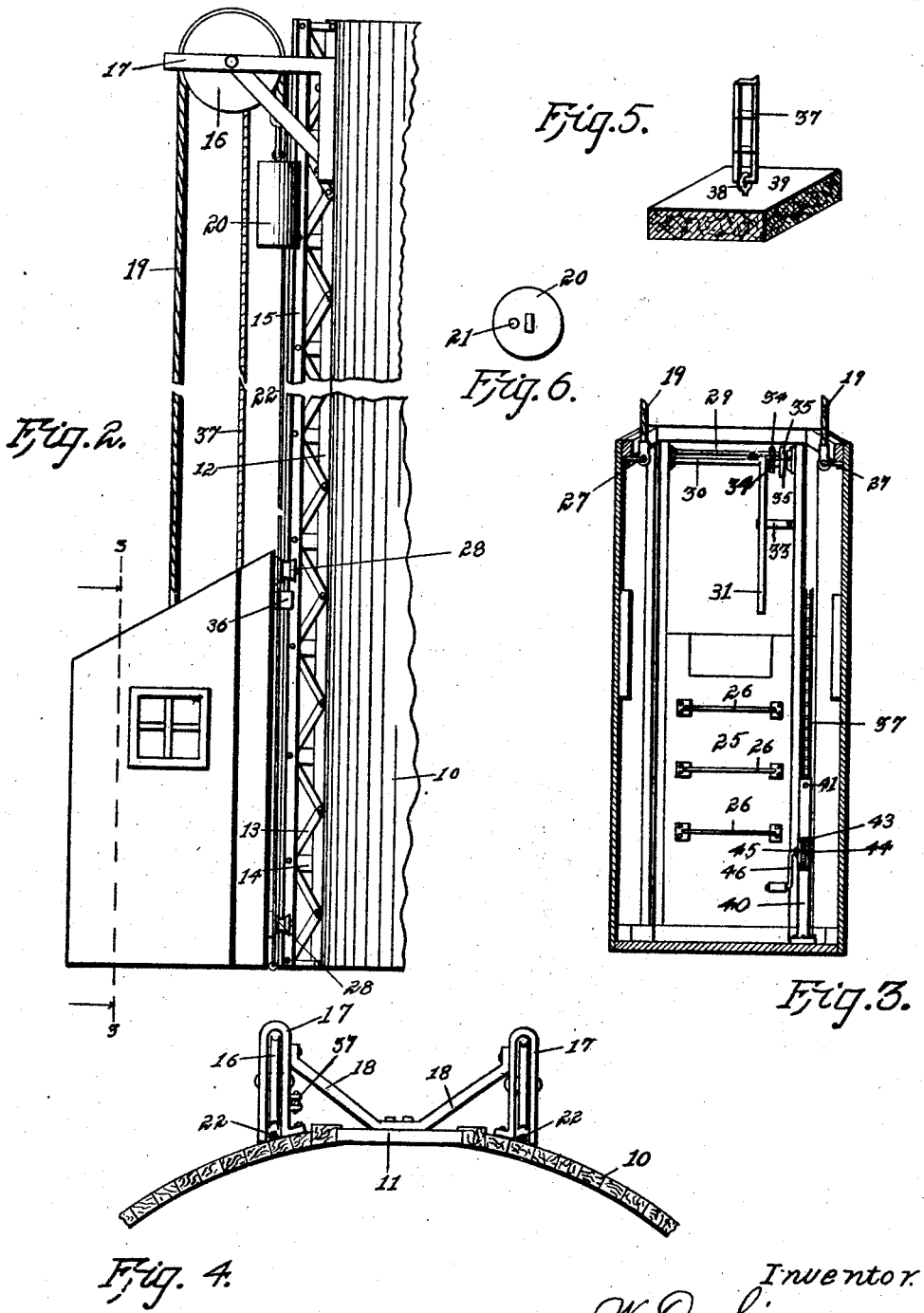

April 28, 1925.
W. O. SIEVERS
ELEVATOR FOR SILOS
Filed Nov. 4, 1922
1,535,499
3 Sheets-Sheet 3
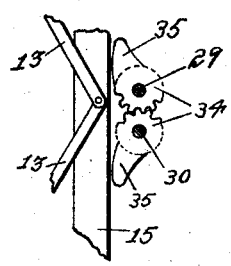
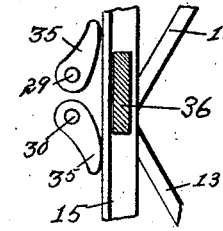
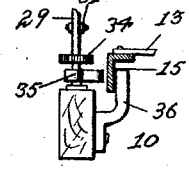
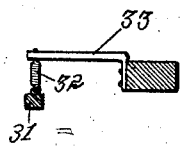
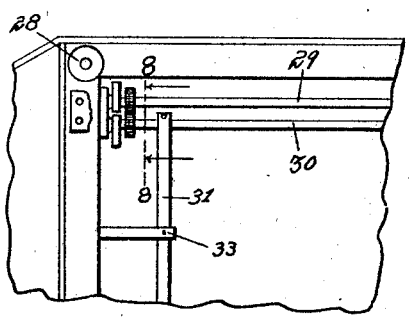
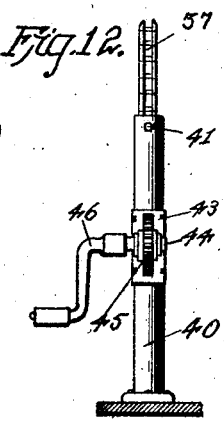
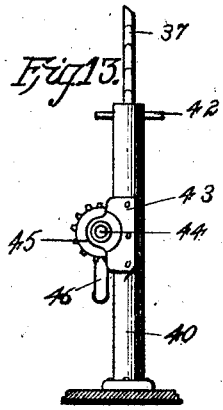
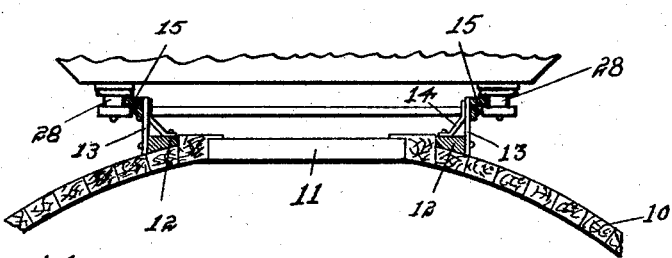
Inventor
W. O. Sievers
by Ewing & Hague Att'ys Patented Apr. 28, 1925.

1,535,499

UNITED STATES PATENT OFFICE.

WILLIAM O. SIEVERS, OF NEWELL, IOWA.

ELEVATOR FOR SILOS.

Application filed November 4, 1922. Serial No. 599,048.

*To all whom it may concern:*

Be it known that I, WILLIAM O. SIEVERS, a citizen of the United States, and a resident of Newell, in the county of Buena Vista, State of Iowa, have invented a certain new and useful Elevator for Silos, of which the following is a specification.

The object of my invention is to provide an elevator of simple, durable and inexpensive construction especially designed for use in connection with silos for the purpose only of removing the ensilage from the silo.

More specifically it is my object to provide an improved form of an elevator cage especially adapted for silo elevators, and so arranged that an operator may readily and easily enter the silo when it is on the ground level and be elevated to the level of the ensilage in the silo, and then can easily get out through the rear of the elevator cage, and then conveniently and easily scrape ensilage from the silo into the elevator, and after this has been done, he can get into the cage on top of the ensilage, and after the cage has returned to the ground level, he can easily remove the ensilage from the cage.

A further object is to provide improved means of simple and inexpensive construction for controlling the movements of the elevator cage, and for holding and locking the cage in any position of its travel.

My invention consists in the construction, arrangement and combination of the various parts of the device, whereby the objects contemplated are attained, as hereinafter more fully set forth, pointed out in my claims, and illustrated in the accompanying drawings, in which:

Figure 2 shows a side elevation of a portion of a silo and a side elevation of my improved elevator device applied thereto.

Figure 3 shows a vertical, central, sectional view of my improved elevator cake taken on the line 3—3 of Figure 2.

Figure 4 shows a horizontal, sectional view of a part of a silo illustrating the cable supporting brackets applied thereto.

Figure 5 shows a detail, perspective view illustrating the means for supporting the lower end of the cage locking chain.

Figure 6 shows a top or plan view of one of the counterbalancing weights.

Figure 7 shows a front view of one of the upper corners of the rear wall of the elevator cage to illustrate the controlling mechanism.

Figure 8 shows a detail, sectional view on the line 8—8 of Figure 7.

Figure 9 shows a detail view partly in section illustrating the elevator cage guide bar and the means for clamping the elevator to it.

Figure 10 shows a detail top view illustrating one of the corner posts of the elevator cage, and the means for clamping the cage to the guide bar, which is shown in horizontal section.

Figure 11 shows a detail sectional view illustrating the spring for holding the elevator controlling lever in its elevator clamping position.

Figure 12 shows a detail, front view of the device for manually raising or lowering the elevator cage, and for locking it in any position of its adjustment.

Figure 13 shows a side elevation of the same.

Figure 14 shows a top or plan view of a portion of a silo with a portion of my improved elevator cage, and illustrating the means for supporting the guide track on the silo, and for guiding the elevator cage on the track.

Figure 1:
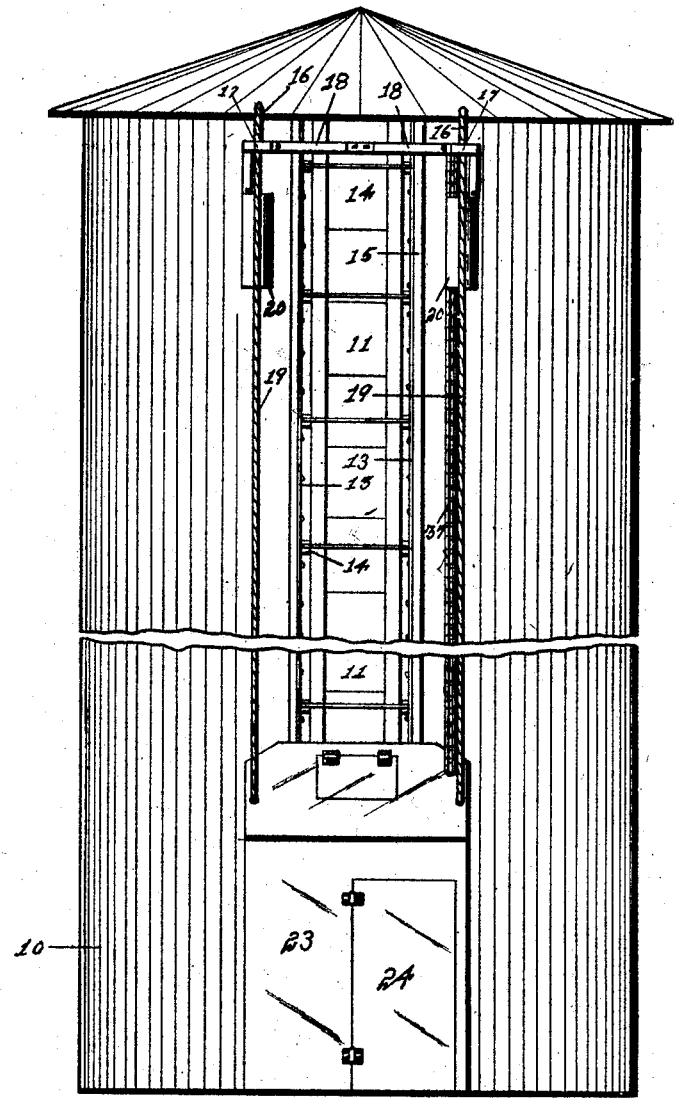
Figure 1 shows a front elevation of a silo having my improved elevator device applied thereto.

Referring to the accompanying drawings, I have used the reference numeral 10 to indicate that portion of the silo shown, provided with the usual silo opening 11 at one side extending substantially the entire length of the silo.

For connecting the elevator guide rails to the silo, I preferably provide two upright supports 12, which may be made of wood, and which are secured to the silo on opposite sides of the door opening 11, and which extend substantially the full length of the silo.

Secured to each of the supports 12 is a series of braces 13 which extend straight outwardly from the silo and another series of braces 14 which are secured to the outer surface of the supports 12, and both sets of braces are connected to the guide rail. Each guide rail is preferably formed of a structural metal angle bar 15.

Near the top of the silo I provide two large pulleys 16, each of which is mounted in a bracket 17 securely bolted to the silo. A brace 18 is connected to the brackets and to the silo to prevent the lateral movement of the brackets. A cable 19 is passed around each of the pulleys 16, and one end is connected to the elevator cage and the other to a weight 20. This weight is provided with a vertical opening at 21 through which is passed a guide wire 22, and this guide wire is secured at its upper end to the adjacent bracket 17, and its lower end is firmly fixed to a stationary support to prevent swinging of the weights.

The cage proper comprises an enclosed body portion indicated by the reference numeral 23. In the outer wall of the cage there is a door 24 through which the operator may enter. The rear wall 25 of the cage extends from the bottom upwardly to about half the vertical length of the cage, and the upper portion of the back of the cage, or the part nearest the silo, is left open. On this back 25 I preferably provide steps 26. The cables 19 are attached to the rings 27 at the upper end of the cage.

For guiding the movement of the cage, I have provided, at the upper and lower ends of the cage, guide rollers 28 grooved to receive the laterally projected webs of the angle bar guide rails 15, as clearly shown in Figure 14.

For controlling the movement of the cage upon the guide rails, and for firmly holding the cage in any position throughout the length of the guide rails, I have provided the following mechanism:

Mounted in suitable bearings on the interior of the cage near its upper rear end are two shafts 29 and 30. Fixed to the shaft 30 is a lever 31, and attached to the lever 31 is a contractile coil spring 32, the other end of which is attached to a bracket 33 in the rear of the lever, so by this means the lever is yieldingly held at one limit of its movement, but can be gripped by the operator standing within the cage and moved in a direction opposite to that in which it is pulled by the spring.

Each of the shafts 29 and 30 is provided with a cog wheel 34, and these wheels are in mesh with each other, and fixed to the shaft adjacent to the cog wheels are the cam shaped gripping devices 35 extended in opposite directions. These cam shaped gripping devices are so arranged that they normally stand slightly spaced from the front faces of the angle bar guide rails 15. Fixed to the cage adjacent to the cam shaped gripping devices 35 is a coacting gripping member 36, shown in Figures 2, 9 and 10, and projected from the cage rearwardly and designed to slide up and down with the cage on the side of the rail 15 opposite from the gripping devices. This gripping member 36 is stationary with respect to the cage, but slides up and down relative to the rail 15.

In practical operation with this part of the device, and assuming that the cage is at the ground level, and assuming further that the weights 20 are sufficiently heavy to elevate the cage with a man therein, the operator enters the cage and grasps the lever 31 and moves it forwardly. This releases the gripping cam 25 from the guide rail 15, and permits the cage to be raised by the weights.

The cage is moved in this manner until the rear wall of the cage is substantially flush with the level of the ensilage in the silo, then the operator releases the lever and the gripping cams automatically clutch the rail and clamp it between the gripping member 36 and the gripping cams, thus firmly holding the cage in said position. The operator then climbs up the steps 26 and enters the silo through the opening at the rear of the elevator cage, and scrapes the ensilage from the silo into the cage through the opening at the upper part of the rear of the cage.

When the cage is thus loaded the operator enters it and stands on top of the ensilage. The weight of the cage and the ensilage and the operator combined will exceed the weight of the two weights 20 so that the cage will descend by gravity when free to do so.

When the cage reaches the ground level, the door 24 is opened and enough of the ensilage will run out so the operator can pass out through the door opening, and the remainder of the ensilage will then be removed. Obviously the cage can move only when the operator has his hand upon the lever 31, and it is firmly supported at all other times.

During the normal operation of the elevator as before described no power is required for moving it either up or down. There may be instances, however, in which it is desirable to move the cage in opposition to the weights, and it is also desirable at times to positively lock the cage against up and down movement. For these purposes I have provided an open link chain 37 secured at one end to one of the brackets 17, as shown in Figure 4, and at the lower end to a link 38 embedded in a concrete block 39 at the ground level. This chain is stretched taut and is stationary.

Secured to the floor of the cage is a pipe 40 open at both ends and provided with an opening 41 through which a lock pin 42 may be inserted, which pin will also pass through the adjacent open link of the chain to thereby securely lock the elevator cage in any position of its movement.

Mounted upon the central portion of the pipe 40 is a bracket 43, in which is mounted a shaft 44 and a pinion 45, which pinion has its teeth inserted in the open links of the chain. I also provide a detachable crank 46 applied to one end of the shaft 44. By this means, and when it is desired to move the cage, the operator attaches the crank 46 to the shaft 44, and by rotating the crank the cage may be raised or lowered, and by inserting the locking pin 42 the cage may be securely locked.

Some of the advantages of my improvement are, first is its extreme simplicity and cheapness of construction, and I find that it can be erected and applied to a silo at less cost than that of the ordinary silo chute, which is provided for the purpose of serving some of the same functions as my device.

In actual operation, however, my improvement has many advantages. It is not intended in any way to be used for filling the silo. It is merely for the purpose of removing the ensilage for feeding purposes from time to time.

During the normal operation of the device, no power is required for either raising or lowering the cage; and in addition to this, the ensilage is not widely distributed over the ground, because the operator can readily stop the cage directly above the wagon or truck, and scrape the ensilage out of the cage into the wagon or truck, and on account of the adjustability of the cage, it may be lowered to a point resting upon the wagon or truck so that wind will not blow the ensilage away from the wagon or truck.

In the event that the operator should permit the cage to rise too high for convenient loading, it may be lowered by means of the crank 46. Or in the event it is desired to run the cage down without first filling it with ensilage, this may be done by manipulating the crank.

I claim as my invention:

1. An elevator for silos comprising in combination stationary upright guide rails designed to be secured to a silo on opposite sides of the door opening, an elevator cage, a counter balancing weight device for the elevator cage, a gripping device carried by the cage having a stationary member fixed to the cage and extended along one side of the guide rails, a movable cam shaped device carried by the elevator device to engage the side of the guide rail opposite from the stationary member, a manually controlled lever for operating the movable gripping cam device, and a spring for normally holding the cam gripping member in its gripped position.

2. An elevator for silos comprising in combination stationary upright guide rails designed to be secured to a silo on opposite sides of the door opening, an elevator cage, a counter balancing weight device for the elevator cage, a gripping device carried by the cage and comprising two rotatable shafts arranged parallel with each other, a pinion on each shaft in mesh with each other, a cam gripping member on each shaft extended in opposite directions, a lever fixed to one of the shafts, a stationary gripping member carried by the cage, said stationary and cam gripping members being designed to engage a guide rail on opposite sides, for the purposes stated.

3. In a device of the class described, an elevator cage comprising a bottom, upright front and rear side walls, the rear wall being formed with an opening at its upper portion for entrance and exit into a silo, and one of the other walls being formed with a door opening and a door for said opening, said door opening extending to a point flush with the bottom.

Des Moines, Iowa, September 23, 1922.

WILLIAM O. SIEVERS.